(12) United States Patent
Ling et al.

(10) Patent No.: US 10,970,599 B2
(45) Date of Patent: Apr. 6, 2021

(54) LEARNING COPY SPACE USING REGRESSION AND SEGMENTATION NEURAL NETWORKS

(71) Applicant: ADOBE INC., San Jose, CA (US)

(72) Inventors: Mingyang Ling, San Jose, CA (US); Alex Filipkowski, San Francisco, CA (US); Zhe Lin, Fremont, CA (US); Jianming Zhang, Campbell, CA (US); Samarth Gulati, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 78 days.

(21) Appl. No.: 16/191,724

(22) Filed: Nov. 15, 2018

(65) Prior Publication Data

US 2020/0160111 A1 May 21, 2020

(51) Int. Cl.
*G06K 9/62* (2006.01)
*G06T 7/136* (2017.01)
*G06N 3/04* (2006.01)
*G06T 7/143* (2017.01)
*G06T 7/174* (2017.01)

(52) U.S. Cl.
CPC ......... *G06K 9/6257* (2013.01); *G06N 3/0454* (2013.01); *G06T 7/136* (2017.01); *G06T 7/143* (2017.01); *G06T 7/174* (2017.01); *G06T 2207/20081* (2013.01)

(58) Field of Classification Search
CPC ......... G06T 7/136; G06T 7/143; G06T 7/174; G06T 2207/20081; G06K 9/6257; G06N 3/0454
See application file for complete search history.

(56) References Cited

U.S. PATENT DOCUMENTS

| 8,144,995 B2* | 3/2012 | Thompson ........ G06F 16/5838 382/218 |
| 10,007,863 B1* | 6/2018 | Pereira ........................ G06T 7/60 |
| 10,032,072 B1* | 7/2018 | Tran ....................... G06K 9/6255 |

(Continued)

OTHER PUBLICATIONS

He, et al., "Deep Residual Learning for Image Recognition", arXiv:1512.03385v1, Dec. 10, 2015, 12 pages.

(Continued)

*Primary Examiner* — Gregory M Desire
(74) *Attorney, Agent, or Firm* — Finch & Maloney PLLC (57) ABSTRACT

Techniques are disclosed for characterizing and defining the location of a copy space in an image. A methodology implementing the techniques according to an embodiment includes applying a regression convolutional neural network (CNN) to an image. The regression CNN is configured to predict properties of the copy space such as size and type (natural or manufactured). The prediction is conditioned on a determination of the presence of the copy space in the image. The method further includes applying a segmentation CNN to the image. The segmentation CNN is configured to generate one or more pixel-level masks to define the location of copy spaces in the image, whether natural or manufactured, or to define the location of a background region of the image. The segmentation CNN may include a first stage comprising convolutional layers and a second stage comprising pairs of boundary refinement layers and bilinear up-sampling layers.

19 Claims, 7 Drawing Sheets

(56) References Cited

U.S. PATENT DOCUMENTS

| | | | | |
|---|---|---|---|---|
| 10,290,107 B1* | 5/2019 | Casas | .................... | G06N 3/084 |
| 10,297,070 B1* | 5/2019 | Zhu | ...................... | G06T 15/205 |
| 10,373,019 B2* | 8/2019 | Nariyambut Murali | ................... | |
| | | | | G06K 9/4628 |
| 10,402,685 B2* | 9/2019 | Guyon | .................. | G06N 20/00 |
| 10,430,876 B1* | 10/2019 | Tang | ..................... | G06N 3/084 |
| 10,437,878 B2* | 10/2019 | Ranzinger | ........... | G06K 9/4604 |
| 10,593,043 B2* | 3/2020 | Lin | ...................... | G06K 9/4628 |
| 2017/0289617 A1* | 10/2017 | Song | ................ | H04N 21/8456 |
| 2018/0260793 A1* | 9/2018 | Li | .................... | G06Q 30/0283 |
| 2019/0095739 A1* | 3/2019 | Gao | ....................... | B60K 35/00 |
| 2019/0138850 A1* | 5/2019 | Sigal | ................... | G06K 9/6256 |

OTHER PUBLICATIONS

He, Kaiming, "deep-residual-networks", downloaded from https://github.com/KaimingHe/deep-residual-networks/blob/master/prototxt/ResNet-50-deploy.prototxt, downloaded Feb. 15, 2019, 34 pages.
Long et al., "Fully Convolutional Networks for Semantic Segmentation", Computer Vision Foundation, 2015, pp. 3431-3440.
Peng et al., "Large Kernel Matters—Improve Semantic Segmentation by Global Convolutional Network", arXiv:1703.02719v1, Mar. 8, 2017, 11 pages.

* cited by examiner

Copy Spaces
100

© 2017 ra2 studio (17 U.S.C. 401)

© 2016 diabluses (17 U.S.C. 401)

Image
410

© 2012 César Torres (17 U.S.C. 401)

Presence 99.76
Type 0.26
Size 86.05

Image
420

© 2017 bongkarn (17 U.S.C. 401)

Presence 99.76
Type 91.27
Size 53.87

Image
430

© 2009 Ergün Özsoy (17 U.S.C. 401)

Presence 0.27
Type – N/A
Size – N/A

Image
440

© 2008 LianeM (17 U.S.C. 401)

Presence 77.85
Type 0.25
Size 61.71

FIG. 4

Image
510

© 2009 Laurin Rinder (17 U.S.C. 401)

Mask (Natural)
520

LEARNING COPY SPACE USING REGRESSION AND SEGMENTATION NEURAL NETWORKS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE DISCLOSURE

This disclosure relates to image analysis techniques using neural networks. Particularly, this disclosure relates to techniques for learning a copy space within an image using regression and segmentation neural networks.

BACKGROUND

The term "copy space" refers to a region within an image or video which provides available space to place text, logos, or other designs. Copy space may be useful, for example, for marketing and other digital content generation tasks, where it is desired to overlay a new image onto a region of an existing image. Designers and artists typically search through catalogs of stock photos to find an image that provides a suitable copy space with which they can work. Such searching is time consuming and expensive. Because copy spaces can take on many shapes and sizes, with varying characteristics, it has proven difficult to design automated systems to find images that include copy spaces that match the requirements of the designer/artist.

DETAILED DESCRIPTION

As noted previously, images with suitable copy space are valuable for designers and artists creating digital content, where the intent is to overlay a new object image on to the original image. This is a common use case for consumers of stock image assets. Unfortunately, manual searching of stock image databases for suitable copy spaces can be difficult, time consuming and expensive, and automated systems to perform this task are generally unavailable or ineffective. To this end, it would be desirable to have a system that is capable of processing images in an automated fashion to identify copy spaces in those images, including their characteristics and locations. The results of this process can then be used to index an image database or otherwise facilitate a subsequent search by the designer or artist who is looking for a particular type of copy space.

Figure 1:
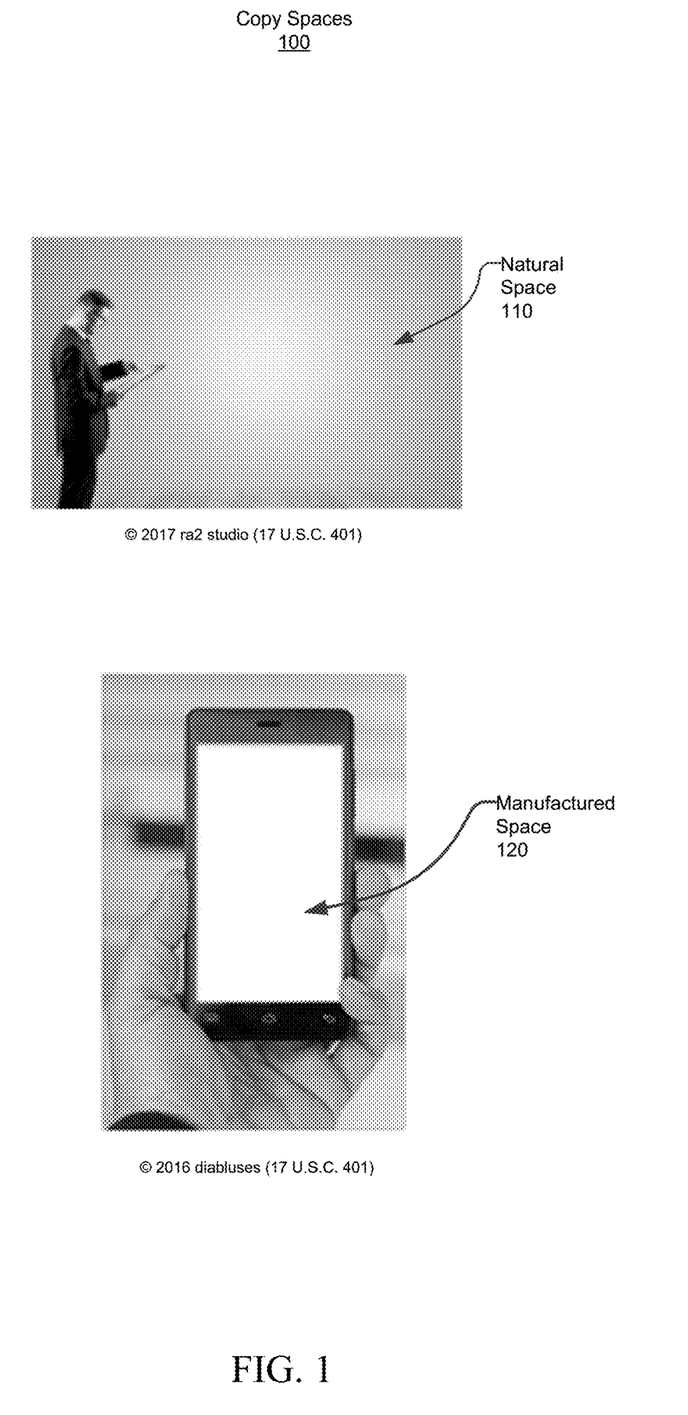
FIG. 1 illustrates example image copy spaces, in accordance with an embodiment of the present disclosure.

Copy spaces can take on many shapes, sizes, and type characteristics. To be considered suitable for a design project, a copy space should generally be uniform in texture and color, otherwise overlaid content may be difficult to read or interpret, or the final image may look unbalanced or poorly composed. FIG. 1 illustrates an example 100 of two types of image copy spaces, in accordance with an embodiment of the present disclosure. Two types of copy space are shown: "natural" 110 and "manufactured" 120. Natural copy space can take on many different forms: solid color backgrounds such as blackboards, white walls; natural backgrounds such as the sky, ground, water, grass and sand; or textured or patterned backgrounds such as wood tables. The natural copy space example 110 is a solid colored wall. Manufactured copy space can take on many forms as well: empty banners, blank business cards, a front-and-center white coffee cup, or a smartphone with a blank screen, as shown in example 120. These images are typically created with the sole intention of providing copy space to an end-user and are rarely useful without an overlay image in the copy space. Manufactured copy spaces are common in stock photo repositories. Since there is no "typical" copy space, a search based on descriptive keywords or title-based descriptions can be challenging.

To this end, the present disclosure provides a neural network learning technique to understand the presence, size, type, and locale of copy spaces within an image, that can facilitate digital asset searching and content creation. According to one example embodiment of the present disclosure, the architecture applies a regression convolutional neural network (CNN) to an image. The regression CNN is configured to predict properties of the copy space such as size and type (natural or manufactured), as will be explained in greater detail below. The prediction is conditioned on an initial determination that there is a copy space in the given image. In this manner, the methodology is bifurcated into a first determination that copy space is present in the given image, and then a second determination that the copy space has certain qualities (e.g., such as a certain size and type). The method further includes applying a segmentation CNN to the image. The segmentation CNN is configured to generate one or more pixel-level masks to define the location of copy spaces in the image, whether natural or manufactured, or to define the location of a background region of the image, as will be explained in greater detail below. In some embodiments, the segmentation CNN includes a first stage comprising convolutional layers and a second stage comprising pairs of boundary refinement layers and bilinear up-sampling layers. In some embodiments, the segmentation CNN operates independently from the regression CNN, which is to say that the segmentation CNN and the regression CNN can operate in parallel, on the same image, without the need to share intermediate results between the networks.

In some such embodiments, the regression CNN and the segmentation CNN are trained on annotated images, for example, from a database of stock photos. The annotations provide information (e.g., truth data) about the properties and locations of the various copy space(s) in a given image (if present), according to some such embodiments. In a more general sense, some annotated images include a copy space having known desired properties, and some annotated images do not include a copy space.

Figure 2:
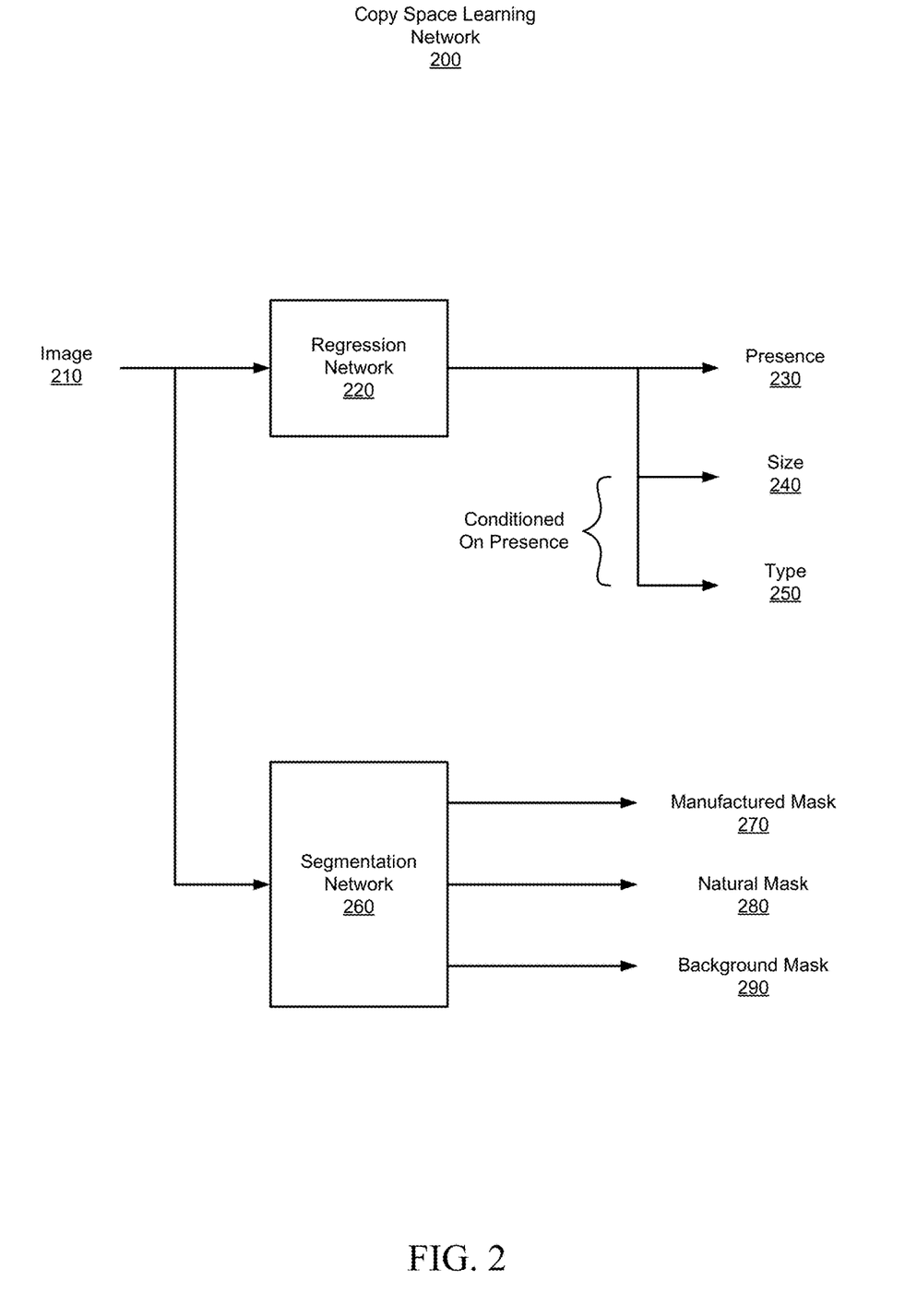
FIG. 2 is a block diagram of a copy space learning network, configured in accordance with an embodiment of the present disclosure.
Figure 6:
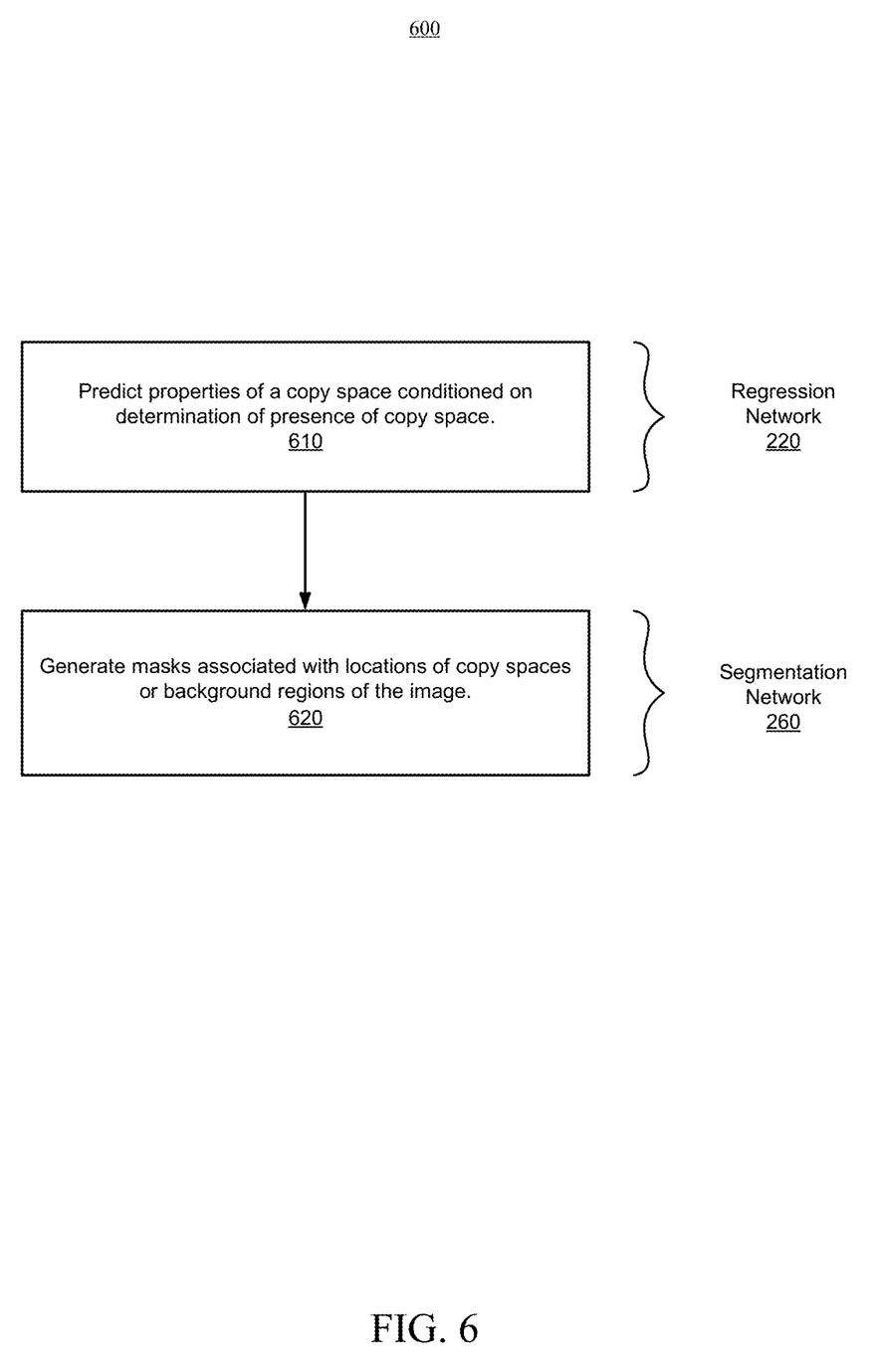
FIG. 6 is a flowchart illustrating a method for copy space learning, in accordance with an embodiment of the present disclosure.

Thus, the foregoing framework provides a tool to process images (whether still images or frames from a video) and detect the presence of copy spaces in those images along with characteristic properties and the locations of those copy spaces. As such, a database containing large numbers of stock photos/images can be efficiently processed and indexed with relevant information about the copy spaces that may be included in each image. The resulting indexed database allows artists and designers to quickly and efficiently find the images that they need for their projects. Such indexing also enables automated searching tools to assist the user in finding the desired copy space image. The disclosed techniques improve workflow efficiency, reduce production time, and lower the cost of copy space based image production. Numerous configurations and variations will be apparent in light of this disclosure System Architecture FIG. 2 is a block diagram of a copy space learning network 200, configured in accordance with an embodiment of the present disclosure. As can be seen, the network 200 comprises a regression convolutional neural network (CNN) and a segmentation CNN 260, the operations of which will be described in greater detail below.

The regression CNN 220 is configured to operate on a provided image 210 and predict properties (e.g., measure attributes) of a copy space in that image. In some embodiments, properties may include, for example, presence 230, size 240, and type 250. The property prediction is conditioned on a determination of the presence 230 of the copy space in the image. The prediction is based on conditional regression analysis and jointly supervised training. The use of a multi-task supervised training method to predict presence, size, and type attributes via a single shared neural network 220 provides benefits over other approaches which use separately trained networks for each attribute prediction. These benefits include decreased memory usage, and improved performance accuracy.

The determination of copy space size 240 and type 250 is dependent upon the presence attribute 230. A conditional loss strategy is employed where size and type regression loss is conditioned on the presence label. This loss function enables joint training with correlated targets, which is to say that all the targets or goals of the network are directed to understanding visual information associated with the copy space.

The regression network 220 takes image 210 as input and outputs three confidence scores for presence $S_p$, size $S_s$, and type $S_t$ of the copy space within the image. Compared to general classification or regression tasks, where the network is trying to solve one problem or learn one attribute, the disclosed techniques provide for the size and type attributes to depend on the presence attribute using conditional multitask loss. Based on presence attribute label value, an $I_{presence}$ gate is applied before both the size and type attribute. If there is a copy space present, the network accumulates loss with size attribute loss $Loss_s$ and type attribute loss $Loss_p$ in addition to presence attribute loss $Loss_p$. Otherwise, only presence loss is considered. This may be expressed by the following equation:

$$I_{presence} = \begin{cases} 0: \text{copy space non presence} \\ 1: \text{copy space presence} \end{cases}$$

$$\text{Loss} = \gamma_p Loss_p + (\gamma_s Loss_s + \gamma_t Loss_t) \cdot I_{presence}$$

where $\gamma_p$, $\gamma_s$, and $\gamma_t$ are heuristically determined weighting factors.

In some embodiments, the regression network 220 may be implemented using a multi-layer ResNet50 network, or any other suitable, known CNN, in light of the present disclosure. The network is trained on annotated images, some of which include copy spaces and some of which do not. The images may be provided for example from a database of stock photos. The annotations provide indicators of copy space presence, copy space size, and copy space type. If no copy space is present, the size and type indicators may be left unspecified.

Figure 3:
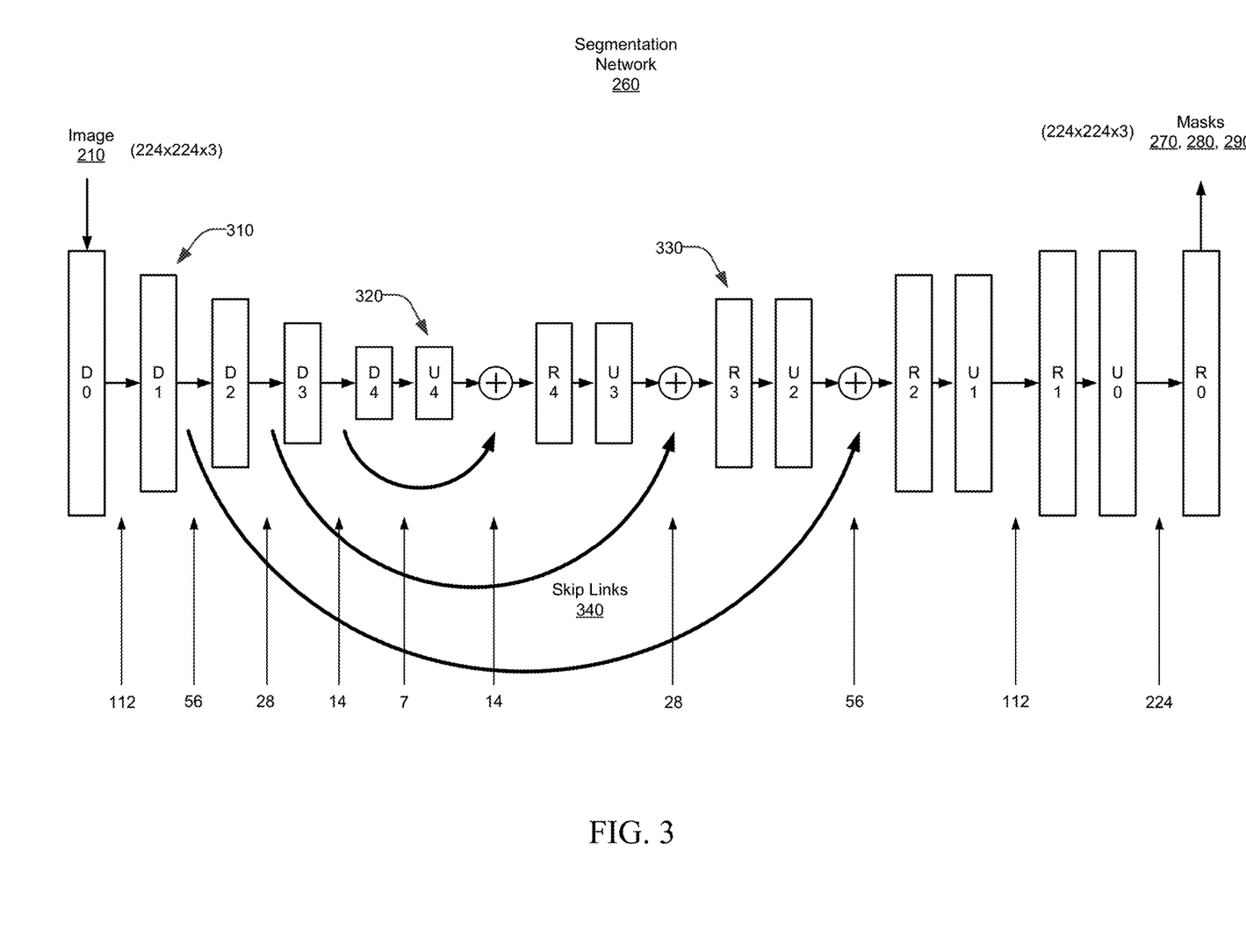
FIG. 3 is a more detailed block diagram of a segmentation network, configured in accordance with an embodiment of the present disclosure.

FIG. 3 is a more detailed block diagram of the segmentation CNN 260, configured in accordance with an embodiment of the present disclosure. The segmentation CNN 260 is shown to include a number of down-sampling convolutional layers 310, bilinear up-sampling layers 320, boundary refinement layers 330, and skip links 340. The segmentation CNN 260 is configured to learn and generate pixel level mask representations 270, 280, 290 associated with the locations of one or more copy spaces or background regions in the image 210. For example, the masks may define the boundaries of the spaces/regions. The copy spaces may be manufactured and/or natural copy spaces in the image. Mask 270 is associated with a manufactured copy space, mask 280 is associated with a natural copy space, and mask 290 is associated with a general background region.

Bilinear up-sampling 320 is used to upscale the image, rather than employing a deconvolutional network for that purpose, which improves processing speed. During up-sampling, skip links 340 are employed to combine or fuse semantic information from the deeper and coarser (e.g., global) layers with visual appearance information from the shallower and finer (e.g., local) layers to improve the accuracy and detail of the segmentations. Residual based boundary refinement layers 330 are employed to operate on the fused information to improve the semantic segmentation accuracy.

In the example segmentation CNN 260 shown in FIG. 3, the input image is shown to have dimensions 224×224×3 (e.g., 224 pixels by 224 pixels by 3 colors). After each down-sampling convolutional layer 310, the dimensions are decreased by a factor of 2 (e.g., down to 112, 56, 28, 14, 7 in turn). The bilinear up-sampling layers correspondingly increase the dimensions by a factor of 2, back up to 224 at the output.

In some embodiments, the segmentation CNN operates independently from the regression CNN, which is to say that the segmentation CNN and the regression CNN can operate in parallel, on the same image, without the need to share intermediate results between the networks.

In some embodiments, the segmentation network 260 may also be implemented using a multi-layer ResNet50 network, or any other suitable, known CNN, in light of the present disclosure. The segmentation network is also trained on annotated images, for example from a database of stock photos, which provide information about the properties and locations of the copy spaces in the image, if present. For example, the annotations may include pixel classifications for each pixel in the image to indicate that the pixel is classified as either background (not copy space), natural copy space, or manufactured copy space.

Figure 4:
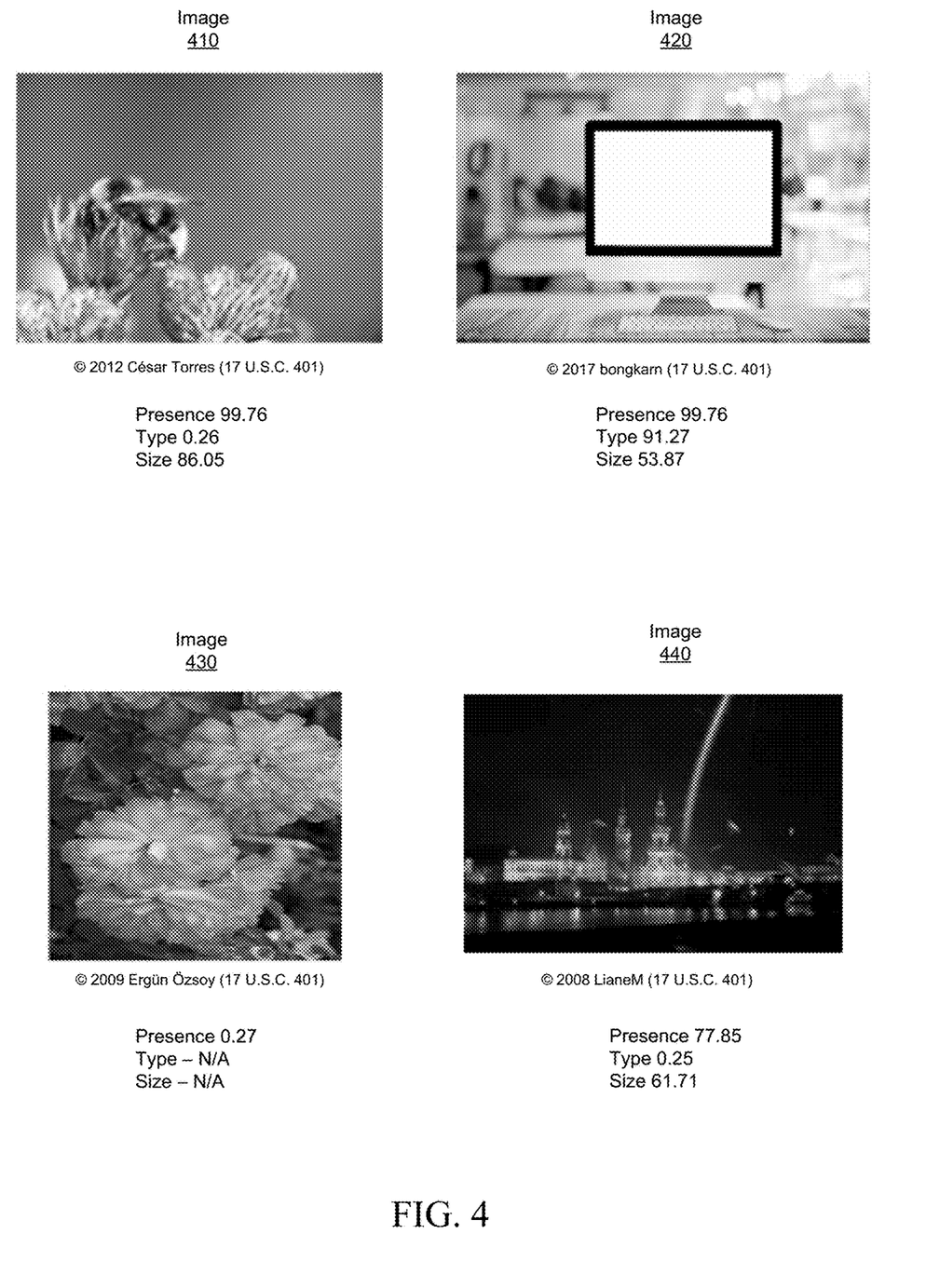
FIG. 4 illustrates results of a regression network, configured in accordance with an embodiment of the present disclosure.

FIG. 4 illustrates results of the regression network 220, configured in accordance with an embodiment of the present disclosure. Confidence scores range from 0 to 100. A presence score of 100 indicates a high confidence for the presence of a copy space in the image. A type score close to 0 indicates a natural copy space, while a type score close to 100 indicates a manufactured copy space. A size score close to zero indicates a small copy space, while a size score close to 100 indicates a large copy space (e.g., most of the image).

Image 410 is shown to have a copy space presence score of 99.76, indicating high confidence of the presence of a copy space within the image, a type score of 0.26 indicating a natural copy space (e.g., the out of focus background region), and a size of 86.05 indicating a relatively large copy space.

Image 420 is shown to have a copy space presence score of 99.76, indicating high confidence of the presence of a copy space within the image, a type score of 91.27 indicating a manufactured copy space (e.g., the region on the computer screen), and a size of 53.87 indicating a moderate sized copy space.

Image 430 is shown to have a copy space presence score of 0.27, indicating that there is likely not any copy space within the image. As such, no meaningful type or size score is generated.

Image 440 is shown to have a copy space presence score of 77.85, indicating a more moderate confidence of the presence of a copy space within the image, a type score of 0.25 indicating a natural copy space (e.g., the darkest areas in the background and foreground), and a size of 61.71 indicating a medium sized copy space.

Figure 5:
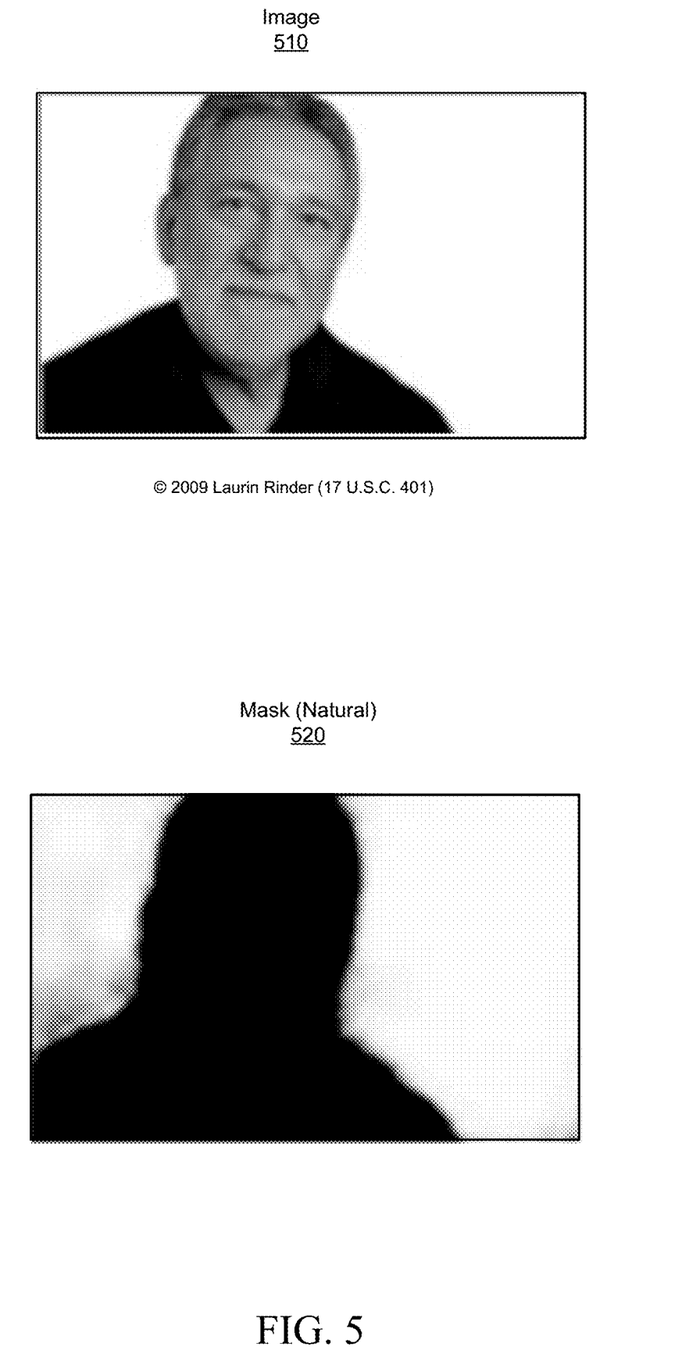
FIG. 5 illustrates results of a segmentation network, configured in accordance with an embodiment of the present disclosure.

FIG. 5 illustrates results of the segmentation network 260, configured in accordance with an embodiment of the present disclosure. The input image 510 shows a picture of a man against a white background which is a natural copy space. The segmentation network output is a pixel mask 520 which defines the copy space region (e.g., the white areas of the mask).

Methodology

FIG. 6 is a flowchart 600 illustrating a method for learning a copy space of an image, in accordance with an embodiment of the present disclosure. As can be seen, the method is described with reference to the configuration of regression network 220, and segmentation network 260, of FIGS. 2 and 3. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 610, by applying a regression convolutional neural network (CNN) to an image. The regression CNN is configured to predict properties of a copy space in the image. The prediction is conditioned on a determination of the presence of the copy space in the image.

The method continues, at operation 620, by applying a segmentation CNN to the image. The segmentation CNN is configured to generate masks associated with the locations of one or more copy spaces or background regions in the image. For example, the masks may define the boundaries of the spaces/regions. The copy spaces may include manufactured and/or natural copy spaces in the image. In some embodiments, the segmentation CNN network includes a first stage comprising convolutional layers and a second stage comprising pairs of boundary refinement layers and bilinear up-sampling layers, as previously described. In some embodiments, the segmentation CNN operates independently from the regression CNN.

In some embodiments, additional operations are performed. For example, in one embodiment, the regression CNN and the segmentation CNN are trained on annotated images, for example from a database of stock photos, some of which include copy spaces and some of which do not include copy spaces. The annotations provide information about one or more of copy space presence, copy space size, copy space type, and pixel classifications. In some embodiments, the image may be a frame from a video.

Additionally, in some embodiments, the results of the copy space learning network may be used to facilitate searching of an image database to provide images that include copy spaces with suitable characteristics.

Example Platform

Figure 7:
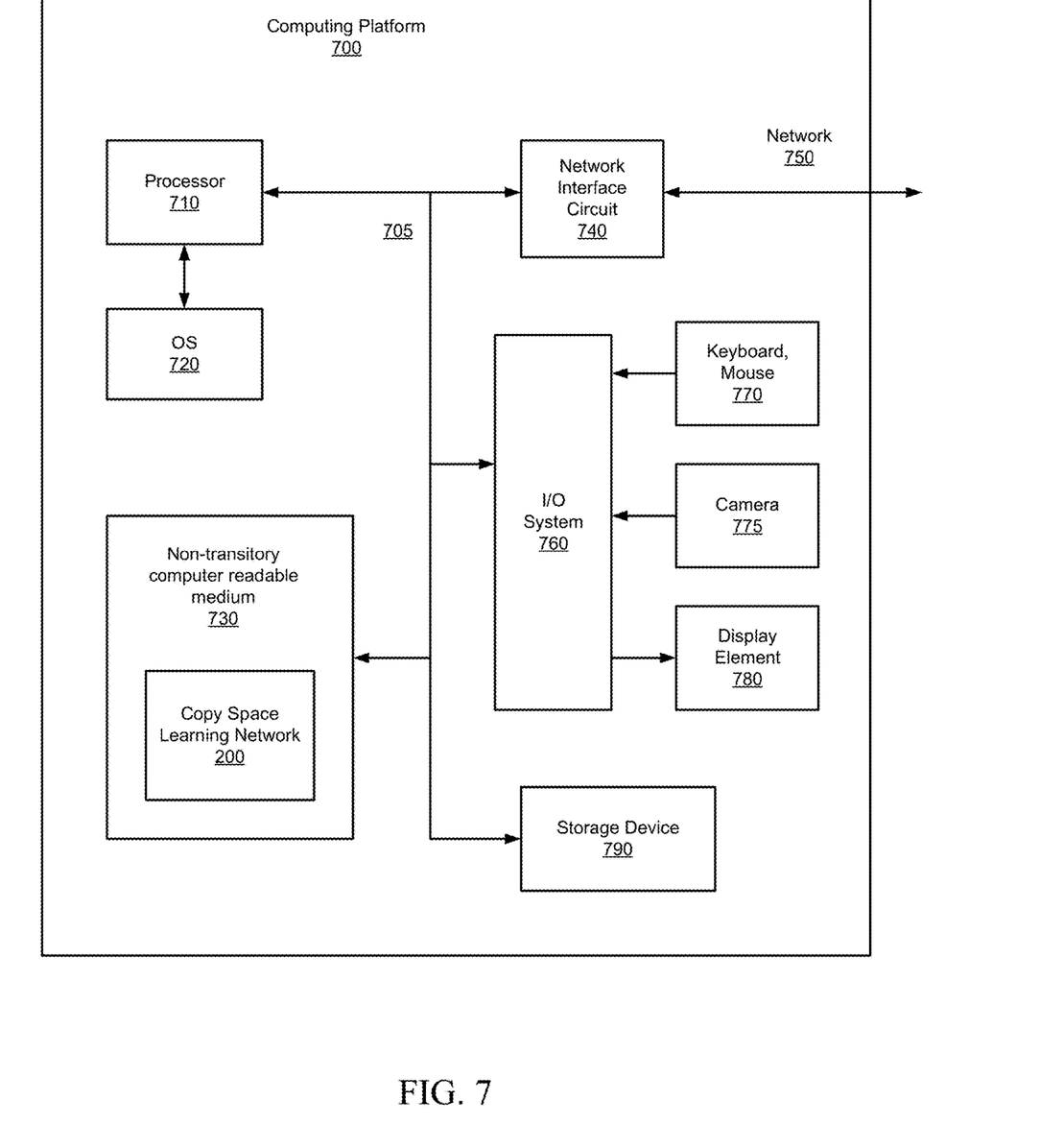
FIG. 7 is a block diagram schematically illustrating a computing platform configured to perform any of the techniques as variously described in this disclosure, configured in accordance with an embodiment of the present disclosure.

FIG. 7 is a block diagram schematically illustrating a computing platform 700 configured to perform any of the techniques as variously described in this disclosure, configured in accordance with an embodiment of the present disclosure. For example, in some embodiments, the copy space learning network 200 of FIG. 2, or any portions thereof, and the methodologies of FIG. 6, or any portions thereof, are implemented in the computing platform 700. In some embodiments, the computing platform 700 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing platform 700 includes one or more storage devices 790 and/or non-transitory computer-readable media 730 having encoded thereon one or more computer-executable instructions or software for implementing techniques as variously described in this disclosure. In some embodiments, the storage devices 790 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 790 includes other types of memory as well, or combinations thereof. In one embodiment, the storage device 790 is provided on the computing platform 700. In another embodiment, the storage device 790 is provided separately or remotely from the computing platform 700. The non-transitory computer-readable media 730 include, but are not limited to, one or more types of hardware memory, non-transitory tangible media (for example, one or more magnetic storage disks, one or more optical disks, one or more USB flash drives), and the like. In some embodiments, the non-transitory computer-readable media 730 included in the computing platform 700 store computer-readable and computer-executable instructions or software for implementing various embodiments. In one embodiment, the computer-readable media 730 are provided on the computing platform 700. In another embodiment, the computer-readable media 730 are provided separately or remotely from the computing platform 700.

The computing platform 700 also includes at least one processor 710 for executing computer-readable and computer-executable instructions or software stored in the storage device 790 and/or non-transitory computer-readable media 730 and other programs for controlling system hardware. In some embodiments, virtualization is employed in the computing platform 700 so that infrastructure and resources in the computing platform 700 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 705 is also provided to allow for communication between the various components listed above and/or other components not shown. Computing platform 700 can be coupled to a network 750 (e.g., a local or wide area network such as the internet), through network interface circuit 740 to allow for communications with other computing devices, platforms, resources, clients, and Internet of Things (IoT) devices.

In some embodiments, a user interacts with the computing platform 700 through an input/output system 760 that interfaces with devices such as a keyboard and mouse 770 and/or a display element (screen/monitor) 780 which provides a user interface to accept user input and guidance, for example to configure or control the copy space learning. In some embodiments, the computing platform 700 includes a camera 775 which may be configured to provide images or videos to be processed by the copy space learning network 200. In some embodiments, the computing platform 700 includes other I/O devices (not shown) for receiving input from a user, for example, a pointing device or a touchpad, etc., or any suitable user interface. In some embodiments, the computing platform 700 includes other suitable conventional I/O peripherals. The computing platform 700 can include and/or be operatively coupled to various suitable devices for performing one or more of the aspects as variously described in this disclosure.

In some embodiments, the computing platform 700 runs an operating system (OS) 720, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 700 and performing the operations described in this disclosure. In one embodiment, the operating system runs on one or more cloud machine instances.

As will be appreciated in light of this disclosure, the various modules and components of the system, including the regression network 220 and the segmentation network 260, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing platform 700, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 includes a method for learning copy space of an image, the method comprising: applying, by a processor-based system, a regression convolutional neural network (CNN) to an image, the regression CNN to predict properties of a copy space, the properties including size and type, the prediction conditioned on a determination by the CNN of a copy space presence in the image; and applying, by the processor-based system, a segmentation CNN to the image, the segmentation CNN to generate one or more masks associated with locations of one or more of a manufactured copy space in the image, a natural copy space in the image, and a background region of the image.

Example 2 includes the subject matter of Example 1, wherein the segmentation CNN operates independently from the regression CNN.

Example 3 includes the subject matter of Examples 1 or 2, wherein the size is represented as a confidence score ranging from small to large, and the type is represented as a confidence score ranging from natural to manufactured.

Example 4 includes the subject matter of any of Examples 1-3, wherein the segmentation CNN network includes a first stage comprising convolutional layers and a second stage comprising pairs of boundary refinement layers and bilinear up-sampling layers.

Example 5 includes the subject matter of any of Examples 1-4, wherein the regression CNN and the segmentation CNN are trained on a first set of annotated images and a second set of annotated images, the first set of annotated images including copy spaces, the second set of annotated images not including copy spaces, the annotations indicating one or more of copy space presence, copy space size, copy space type, and pixel classifications to indicate one or more of background, natural, and manufactured classifications.

Example 6 includes the subject matter of any of Examples 1-5, further comprising: searching a database of images for an image that includes a copy space associated with desired properties, the searching based on results from the regression CNN and the segmentation CNN; and identifying at least one image that includes a copy space associated with the desired properties.

Example 7 includes the subject matter of any of Examples 1-6, wherein the image is a frame of a video.

Example 8 is a system for learning copy space of an image, the system comprising: one or more processors; a regression convolutional neural network (CNN) module at least one of controllable and executable by the one or more processors, and configured to operate on an image and predict properties of a copy space, the properties including size and type, the prediction conditioned on a determination by the CNN of a copy space presence in the image; and a segmentation CNN module at least one of controllable and executable by the one or more processors, and configured to operate on the image and generate one or more masks associated with locations of one or more of a manufactured copy space in the image, a natural copy space in the image, and a background region of the image.

Example 9 includes the subject matter of Example 8, wherein the segmentation CNN operates independently from the regression CNN.

Example 10 includes the subject matter of Examples 8 or 9, wherein the size is represented as a confidence score ranging from small to large, and the type is represented as a confidence score ranging from natural to manufactured.

Example 11 includes the subject matter of any of Examples 8-10, wherein the segmentation CNN network includes a first stage comprising convolutional layers and a second stage comprising pairs of boundary refinement layers and bilinear up-sampling layers.

Example 12 includes the subject matter of any of Examples 8-11, wherein the regression CNN and the segmentation CNN are trained on annotated images.

Example 13 includes the subject matter of any of Examples 8-12, wherein the image is a frame of a video.

Example 14 is a non-transitory computer program product having instructions encoded thereon that when executed by one or more computer processors cause the one or more computer processors to perform a process comprising: applying a regression convolutional neural network (CNN) to an image, the regression CNN to predict properties of a copy space, the properties including size and type, the prediction conditioned on a determination by the CNN of a copy space presence in the image; and applying a segmentation CNN to the image, the segmentation CNN to generate one or more masks associated with locations of one or more of a manufactured copy space in the image, a natural copy space in the image, and a background region of the image.

Example 15 includes the subject matter of Example 14, wherein the segmentation CNN operates independently from the regression CNN.

Example 16 includes the subject matter of Examples 14 or 15, wherein the size is represented as a confidence score ranging from small to large, and the type is represented as a confidence score ranging from natural to manufactured.

Example 17 includes the subject matter of any of Examples 14-16, wherein the segmentation CNN network includes a first stage comprising convolutional layers and a second stage comprising pairs of boundary refinement layers and bilinear up-sampling layers.

Example 18 includes the subject matter of any of Examples 14-17, wherein the regression CNN and the segmentation CNN are trained on a first set of annotated images and a second set of annotated images, the first set of annotated images including copy spaces, the second set of annotated images not including copy spaces, the annotations indicating one or more of copy space presence, copy space size, copy space type, and pixel classifications to indicate one or more of background, natural, and manufactured classifications.

Example 19 includes the subject matter of any of Examples 14-18, the process further comprising: searching a database of images for an image that includes a copy space associated with desired properties, the searching based on results from the regression CNN and the segmentation CNN; and identifying at least one image that includes a copy space associated with the desired properties.

Example 20 includes the subject matter of any of Examples 14-19, wherein the image is a frame of a video.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for learning copy space of an image, the method comprising:
    applying, by a processor-based system, a regression convolutional neural network (CNN) to an image, the regression CNN to make a prediction of properties of a copy space, the properties including size and type, the prediction conditioned on a determination by the regression CNN of a copy space presence in the image;
    applying, by the processor-based system, a segmentation CNN to the image, the segmentation CNN to generate one or more masks associated with locations of one or more of a manufactured copy space in the image, a natural copy space in the image, and a background region of the image;
    searching a database of images for an image that includes a copy space associated with desired properties, the searching based on results from the regression CNN and the segmentation CNN; and
    identifying at least one image that includes the copy space associated with the desired properties.

2. The method of claim 1, wherein the segmentation CNN operates independently from the regression CNN.

3. The method of claim 1, wherein the size is represented as a confidence score ranging from small to large, and the type is represented as a confidence score ranging from natural to manufactured.

4. The method of claim 1, wherein the segmentation CNN includes a first stage comprising convolutional layers and a second stage comprising pairs of boundary refinement layers and bilinear up-sampling layers.

5. The method of claim 1,
    wherein the regression CNN and the segmentation CNN are trained on a first set of annotated images and a second set of annotated images, the first set of annotated images including copy spaces, the second set of annotated images not including copy spaces; and
    wherein at least one of the first and second sets of annotated images includes annotations indicating one or more of copy space presence, copy space size, copy space type, and pixel classifications to indicate one or more of background, natural, and manufactured classifications.

6. The method of claim 1, wherein the image is a frame of a video.

7. A system for learning copy space of an image, the system comprising:
one or more processors;
a regression convolutional neural network (CNN) module at least one of controllable and executable by the one or more processors, and configured to operate on an image and make a prediction of properties of a copy space, the properties including size and type, the prediction conditioned on a determination by the regression CNN of a copy space presence in the image; and
a segmentation CNN module at least one of controllable and executable by the one or more processors, and configured to operate on the image and generate one or more masks associated with locations of one or more of a manufactured copy space in the image, a natural copy space in the image, and a background region of the image;
wherein the one or more processors are configured to search a database of images for an image that includes a copy space associated with desired properties, the one or more processors being configured to search based on results from the regression CNN and the segmentation CNN; and
wherein the one or more processors are further configured to identify at least one image that includes the copy space associated with the desired properties.

8. The system of claim 7, wherein the segmentation CNN operates independently from the regression CNN.

9. The system of claim 7, wherein the size is represented as a confidence score ranging from small to large, and the type is represented as a confidence score ranging from natural to manufactured.

10. The system of claim 7, wherein the segmentation CNN includes a first stage comprising convolutional layers and a second stage comprising pairs of boundary refinement layers and bilinear up-sampling layers.

11. The system of claim 7, wherein the regression CNN and the segmentation CNN are trained on annotated images.

12. The system of claim 7, wherein the image is a frame of a video.

13. The system of claim 7, wherein:
the regression CNN and the segmentation CNN are trained on a first set of annotated images and a second set of annotated images, the first set of annotated images including copy spaces, the second set of annotated images not including copy spaces; and
at least one of the first and second sets of annotated images includes annotations indicating one or more of copy space presence, copy space size, copy space type, and pixel classifications to indicate one or more of background, natural, and manufactured classifications.

14. A non-transitory computer program product having instructions encoded thereon that when executed by one or more computer processors cause the one or more computer processors to perform a process comprising:
applying a regression convolutional neural network (CNN) to an image, the regression CNN to make a prediction of properties of a copy space, the properties including size and type, the prediction conditioned on a determination by the regression CNN of a copy space presence in the image; and
applying a segmentation CNN to the image, the segmentation CNN to generate one or more masks associated with locations of one or more of a manufactured copy space in the image, a natural copy space in the image, and a background region of the image;
wherein the regression CNN and the segmentation CNN are trained on a first set of annotated images and a second set of annotated images, the first set of annotated images including copy spaces, the second set of annotated images not including copy spaces; and
wherein at least one of the first and second sets of annotated images includes annotations indicating one or more of copy space presence, copy space size, copy space type, and pixel classifications to indicate one or more of background, natural, and manufactured classifications.

15. The non-transitory computer program product of claim 14, wherein the segmentation CNN operates independently from the regression CNN.

16. The non-transitory computer program product of claim 14, wherein the size is represented as a confidence score ranging from small to large, and the type is represented as a confidence score ranging from natural to manufactured.

17. The non-transitory computer program product of claim 14, wherein the segmentation CNN includes a first stage comprising convolutional layers and a second stage comprising pairs of boundary refinement layers and bilinear up-sampling layers.

18. The non-transitory computer program product of claim 14, the process further comprising:
searching a database of images for an image that includes a copy space associated with desired properties, the searching based on results from the regression CNN and the segmentation CNN; and
identifying at least one image that includes the copy space associated with the desired properties.

19. The non-transitory computer program product of claim 14, wherein the image is a frame of a video.

* * * * *